Nov. 1, 1966  A. STRASSER  3,282,256
WATER HEATING FURNACE FOR GASEOUS OR LIQUID FUELS
Filed Nov. 1, 1965
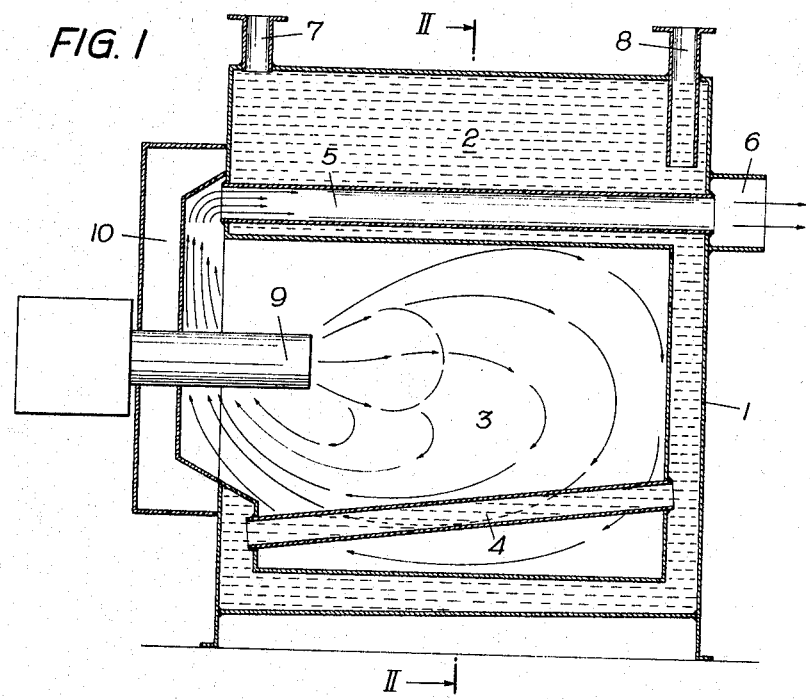
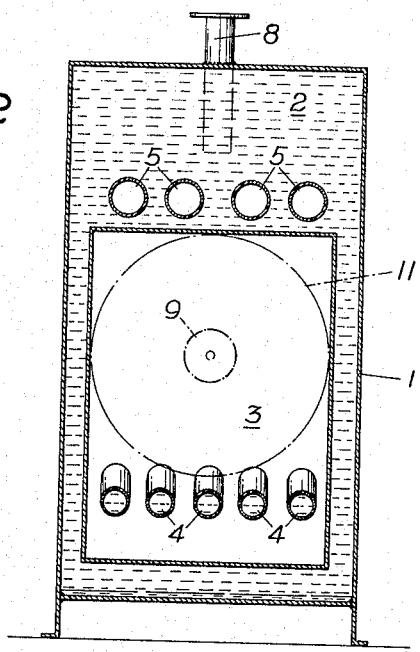
INVENTOR.
ARNOLD STRASSER
BY Young + Thompson
ATTYS.

United States Patent Office 3,282,256
Patented Nov. 1, 1966

3,282,256
WATER HEATING FURNACE FOR GASEOUS
OR LIQUID FUELS
Arnold Strasser, Grosse Neugasse 28, Vienna, Austria
Filed Nov. 1, 1965, Ser. No. 505,783
3 Claims. (Cl. 122—149)

This invention relates to a water heating furnace adapted to be fired with gaseous or liquid fuels. In water heating furnaces adapted to be fed with liquid or gaseous fuels, it is difficult to obtain a flame which is nonvibrating and reliable so that the combustion is as complete as possible and the released heat is transferred with minimum losses to the heat-receiving surfaces of the combustion chamber and is delivered to the heat transfer fluid, such as water.

To solve this problem, a furnace for a water heater has been suggested, which furnace comprises a combustion chamber which is defined by flat walls and totally enclosed, except for the flue gas exit opening disposed at the same end as the burner. In this known furnace, the fuel-air mixture is injected parallel to a plane surface of the combustion chamber and the combustion gases are guided like a cyclone in a plurality of cycles along the combustion chamber, which is four cornered in cross-section. The guidance of the combustion gases in a cyclone has the disadvantage that completely burnt gases repeatedly contact the flame core and constitute a ballast in the combustion chamber. As a result, the contact of the flame with oxygen is reduced and vibration may be generated in the furnace.

It is an object of the invention to eliminate these disadvantages. It is a more specific object of the invention to provide a water heating furnace adapted to be fixed with gaseous or liquid fuels and to heat a water heater or steam boiler, which furnace comprises a combustion chamber which is defined by flat walls and is totally enclosed, except for a flue gas exit opening at the fuel inlet end, fire tubes extending along said combustion chamber, e.g., above the same, and water tubes disposed in said combustion chamber, e.g., in a lower portion thereof, in which furnace a non-vibrating and reliable flame is obtained at any desired pressure in the combustion chamber compared to the atmosphere without formation of a cyclone so that a complete combustion and a good heat transfer to the heat transfer fluid are obtained with a high efficiency.

The essential feature of the furnace according to the invention resides in that the injecting tube for the fuel-air mixture protrudes to a large extent into the combustion chamber and is disposed approximately on the axis of a circular cylinder inscribed between the ceiling, the side walls and the tube grate, and a secondary chamber extending throughout the length of the combustion chamber is provided below the tube grate.

The fact that the injecting tube for the fuel-air mixture is approximately equally spaced from the top and side walls of the combustion chamber and extends approximately on the central axis of a circular cylinder which contacts the ceiling of the combustion chamber and the side walls thereof which adjoin the ceiling, has the result that the flame spreads well to all sides and by the intimate contact with the ceiling and the side walls is downwardly reversed and compelled to pass in a transverse flow through the tube grate and without contact or interference with the flame core flows to the firedoor, where it is deflected to escape through the fire tubes. The burnt combustion gases are discharged without stagnation and, owing to the fact that the injecting tube extends far into the combustion chamber, without contacting the flame and obstructing its formation.

Details of the invention will be explained more fully with reference to the drawing, which diagrammatically illustrates by way of example an embodiment of the furnace according to the invention.

FIG. 1 is a longitudinal sectional view showing a water heating furnace and

FIG. 2 a transverse sectional view taken on line II—II of FIG. 1.

In the embodiment shown by way of example, the water heating furnace 1 has a water chamber 2 and a combustion chamber 3. The combustion chamber 3 has an elongated form and is defined by flat walls. Water tubes 4 are arranged in the lower part of the combustion chamber 3 and extend in the longitudinal direction thereof. Fire tubes 5 extend through the water chamber above the combustion chamber. The fire tubes 5 discharge into a flue 6. The supply conduit is indicated at 7 and the return conduit at 8.

An injecting tube 9 is provided for supplying a fuel-air mixture into the combustion chamber 3. This tube extends far into the combustion chamber and is secured in a firedoor 10. The lining of the firedoor is formed with a recess for the discharge of the burnt bases. The injecting tube 9 is approximately evenly spaced from the ceiling and the side walls of the combustion chamber 3. In cross-section, the center of the injecting tube 9 is thus approximately at the center of the circle 11 which contacts the ceiling and the side walls of the combustion chamber.

The arrangement of the injecting tube 9 and the fact that it extends far into the combustion chamber enables a good spreading of the combustion gases upwardly and toward the sides so that they can sweep the ceiling and side walls of the combustion chamber. The rear wall of the combustion chamber is also intensely contacted by the flowing combustion gases, which subsequently flow downwardly and in contact with the water tubes 4. This ensures a highly efficient heat transfer to the walls of the combustion chamber and to the heat transfer fluid.

The fact that the injecting tube 9 extends far into the combustion chamber 3 enables an unrestricted flow of the combustion gases to the fire tubes 5. This discharge of the combustion gases does not interfere with the formation of the flame and prevents a formation of stagnant zones.

What is claimed is:

1. A water heating furnace, which comprises chamber means defining a combustion chamber having a generally rectangular cross-section, said chamber means comprising two opposite end walls, two opposite side walls, a top wall, and a bottom wall, said walls being substantially flat, one of said end walls defining a flue gas exit opening, said walls totally enclosing said combustion chamber except for said smoke exit opening, a set of fire tubes communicating with said exit opening and extending over and substantially parallel to said top wall, a water tube grate extending in said combustion chamber throughout the length and across a major portion of the width thereof and dividing said combustion chamber into a large upper portion and a smaller lower portion, and an injecting tube for injecting a fuel-air mixture, said injecting tube projecting from said one end wall for a substantial extent into said upper portion of said combustion chamber substantially on the axis of an imaginary circular cylinder which is inscribed in said upper portion of said combustion chamber and contacts the inside surfaces of said top and side walls.

2. A water heating furnace as set forth in claim 1, in which said water tube grate is arranged so that said imaginary cylinder contacts the top surface of said grate.

3. A water heating furnace as set forth in claim 1, in which said injecting tube extends so far into said upper portion of the combustion chamber that the combustion gases are reversed once in said chamber and flow then back in said smaller lower portion of said combustion chamber outside the suction range of said combustion gases in said upper portion of said combustion chamber and through said exit opening into said fire tubes without contact with the core of the flame formed by said fuel-air mixture injected through said injecting tube.

References Cited by the Examiner
UNITED STATES PATENTS 3,171,388  3/1965  Ganz _____ 122—149

KENNETH W. SPRAGUE, *Primary Examiner.*